(12) United States Patent
Barthelemy et al.

(10) Patent No.: US 8,589,693 B2
(45) Date of Patent: Nov. 19, 2013

(54) METHOD FOR TWO STEP DIGITAL SIGNATURE

(75) Inventors: Serge Barthelemy, Montpellier (FR); Jacques Thieblemont, Mauguio (FR)

(73) Assignee: Paycool International Ltd., Hong Kong (CN)

( * ) Notice: Subject to any disclaimer, the term of this patent is extended or adjusted under 35 U.S.C. 154(b) by 185 days.

(21) Appl. No.: 13/125,591

(22) PCT Filed: Oct. 21, 2009

(86) PCT No.: PCT/FR2009/001234
§ 371 (c)(1),
(2), (4) Date: Jul. 8, 2011

(87) PCT Pub. No.: WO2010/046565
PCT Pub. Date: Apr. 29, 2010

(65) Prior Publication Data
US 2011/0264917 A1 Oct. 27, 2011

(30) Foreign Application Priority Data
Oct. 22, 2008 (FR) ...................................... 08 05870

(51) Int. Cl.
*H04L 9/32* (2006.01)
(52) U.S. Cl.
USPC ............. 713/176; 713/150; 713/180; 380/28; 380/30; 380/44; 380/277
(58) Field of Classification Search
USPC ......... 380/28, 30, 44, 277; 713/150, 176, 180
See application file for complete search history.

(56) References Cited

U.S. PATENT DOCUMENTS

| 5,371,794 | A | * | 12/1994 | Diffie et al. | 713/156 |
| 7,093,133 | B2 | * | 8/2006 | Hopkins et al. | 713/176 |
| 7,519,560 | B2 | * | 4/2009 | Lam et al. | 705/64 |
| 7,676,677 | B2 | * | 3/2010 | Chen et al. | 713/176 |
| 8,321,677 | B2 | * | 11/2012 | Morten | 713/176 |
| 2006/0107058 | A1 | * | 5/2006 | Lewis et al. | 713/176 |
| 2006/0107059 | A1 | * | 5/2006 | Lewis et al. | 713/176 |
| 2007/0208944 | A1 | | 9/2007 | Pavlicic | |
| 2008/0005570 | A1 | * | 1/2008 | Johnson et al. | 713/176 |
| 2008/0089514 | A1 | * | 4/2008 | Futa et al. | 380/44 |

FOREIGN PATENT DOCUMENTS

GB 2 337 145 A 11/1999

OTHER PUBLICATIONS

"Password-Based Cryptography Standard," RSA Laboratories, Mar. 25, 1999, PKCS No. 5, V.2.0. pp. 1-30.

* cited by examiner

*Primary Examiner* — Jeffrey Pwu
*Assistant Examiner* — Jayesh Jhaveri
(74) *Attorney, Agent, or Firm* — Buchanan Ingersoll & Ingersoll PC

(57) ABSTRACT

The invention relates to a method for the digital signature of a message by a signer having an identity and holding a signature device, in which a public key cryptographic scheme is used. The signer has a public key and two private keys, the second private key being deposited at a reliable third party. For each signing operation, two additional steps are respectively carried out with a separate private key, i.e.: the calculation by the signer of a pre-signature of the message using the first private key, and transmitting the message and the pre-signature to the reliable third party; and the verification by the reliable third party of the pre-signature followed by the calculation by the reliable third party of a signature of the message using the second private key deposited at the reliable third party as well as the pre-signature previously calculated by the signer.

20 Claims, 6 Drawing Sheets

Schematic Representation of the Components of the Solution

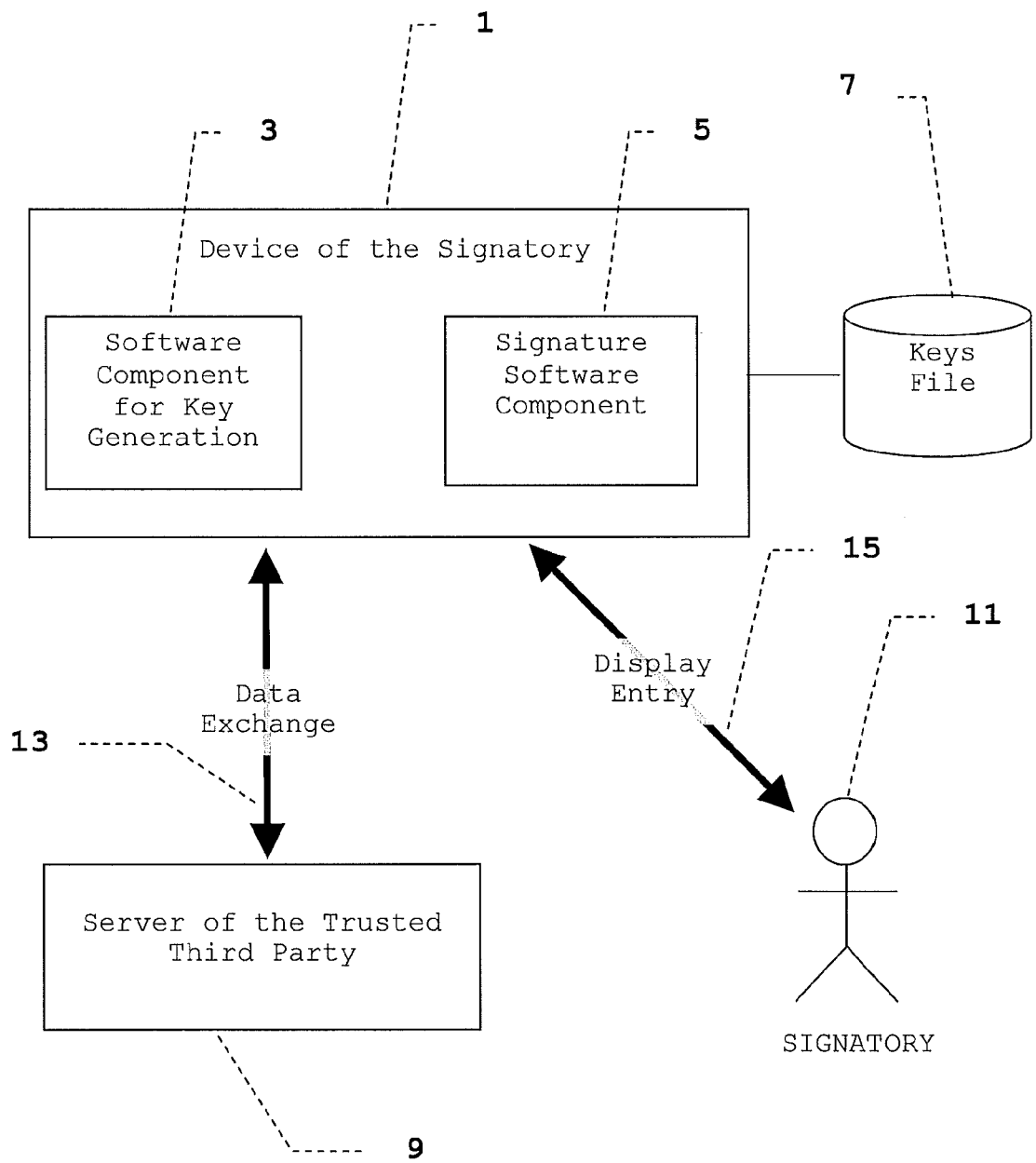
Figure 1: Schematic Representation of the Components of the Solution

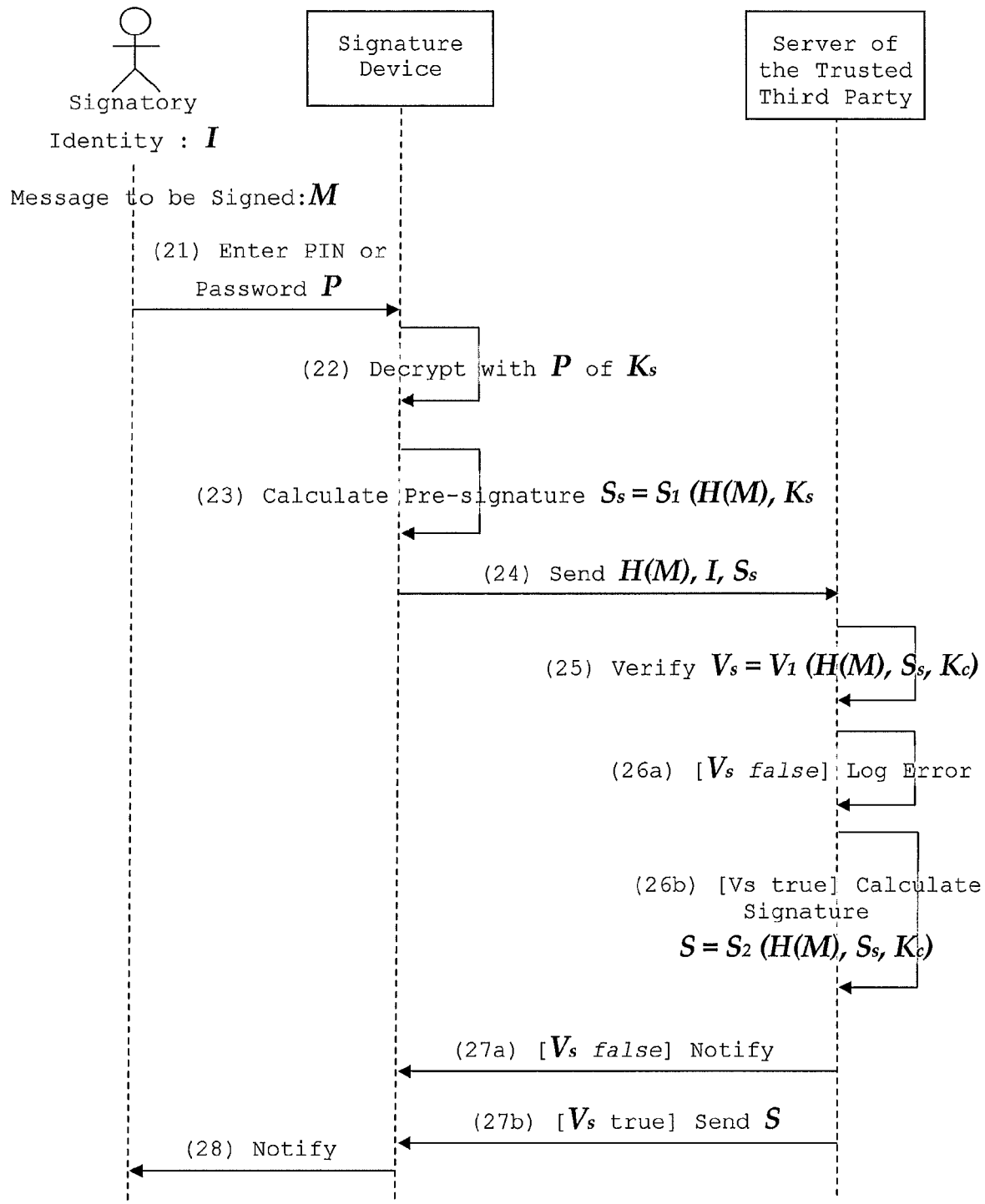
Figure 2: Generic Process for Signature Calculation

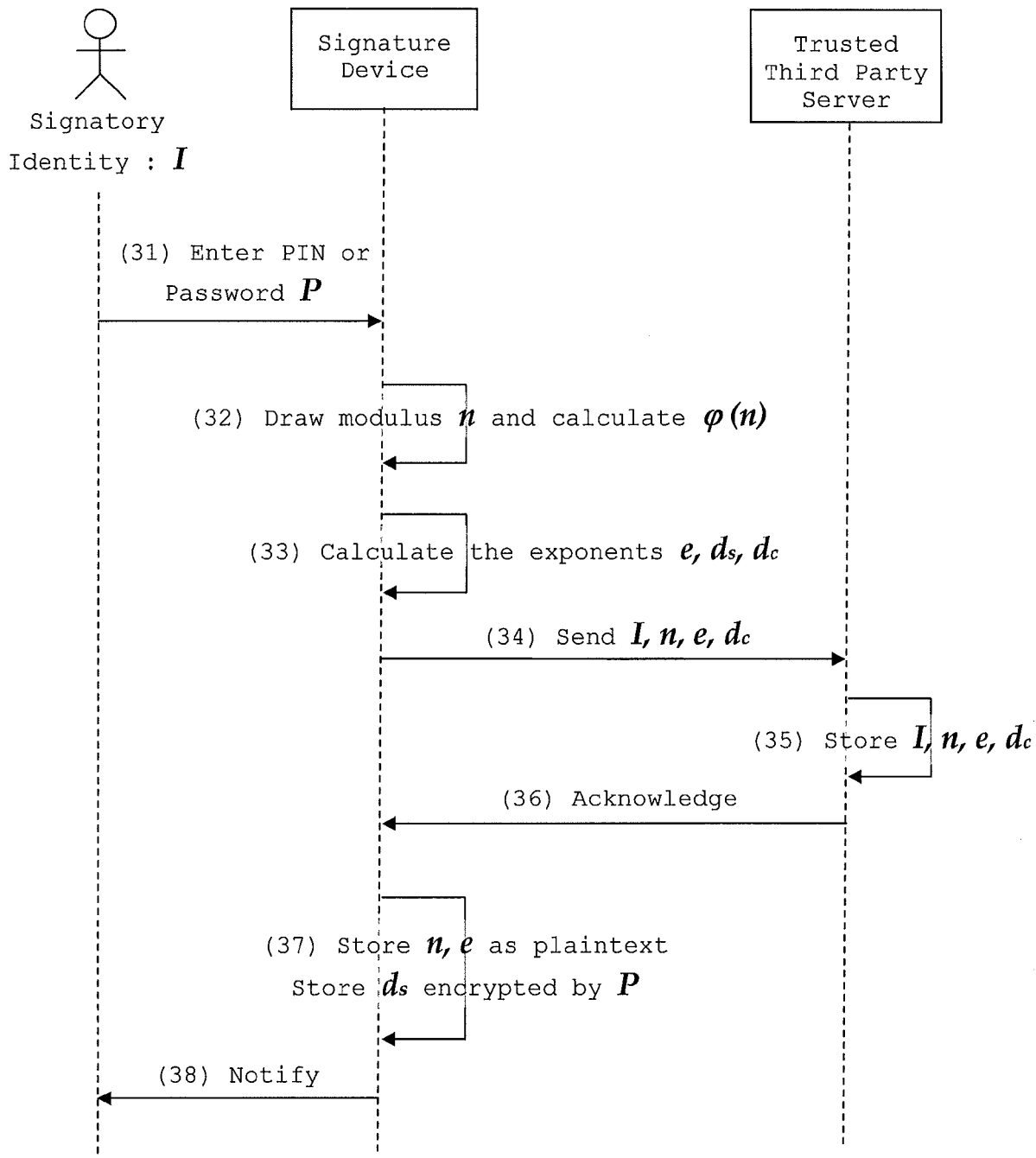
Figure 3: Process for Generating the RSA Keys

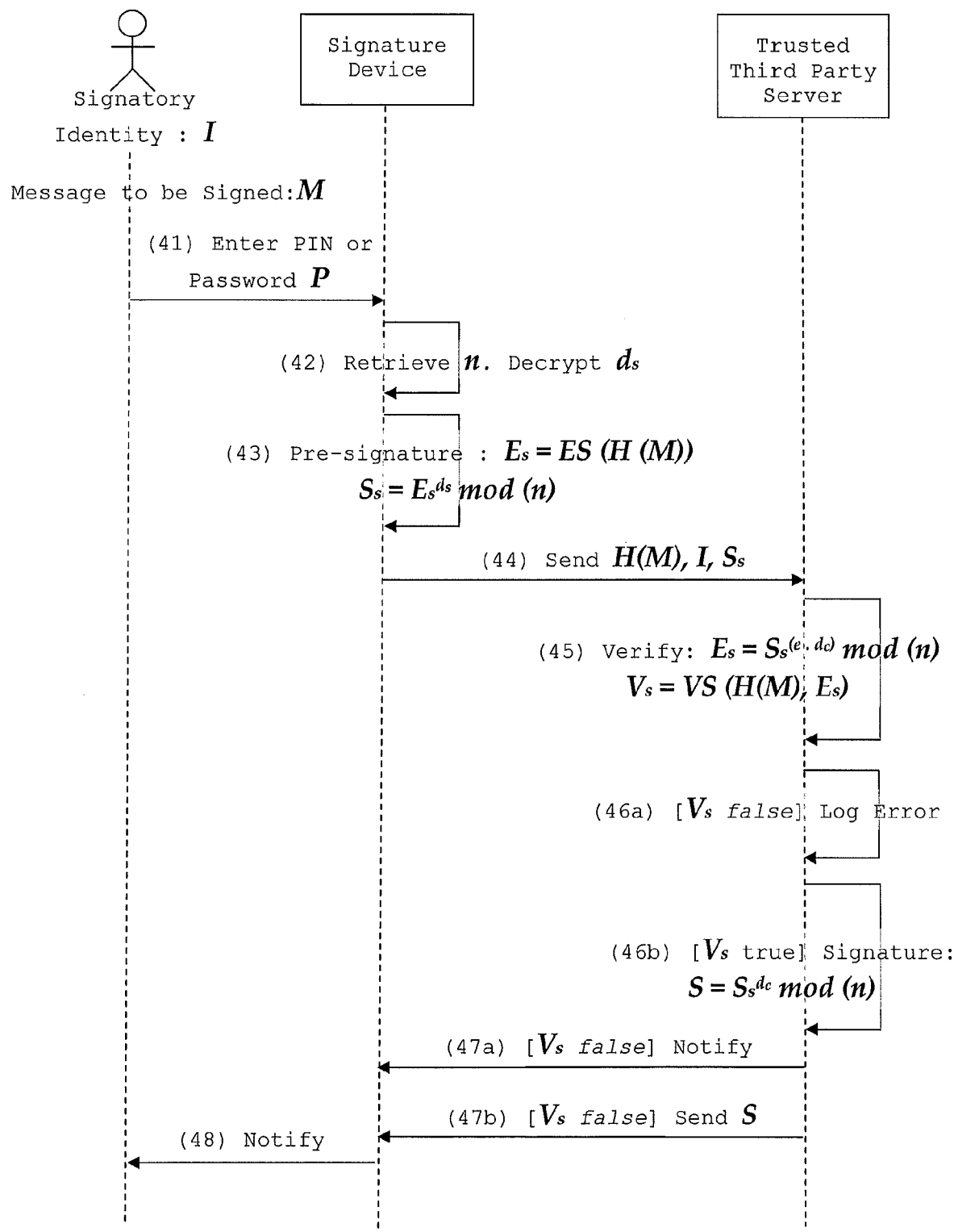
Figure 4: Process for Calculating RSA Signature

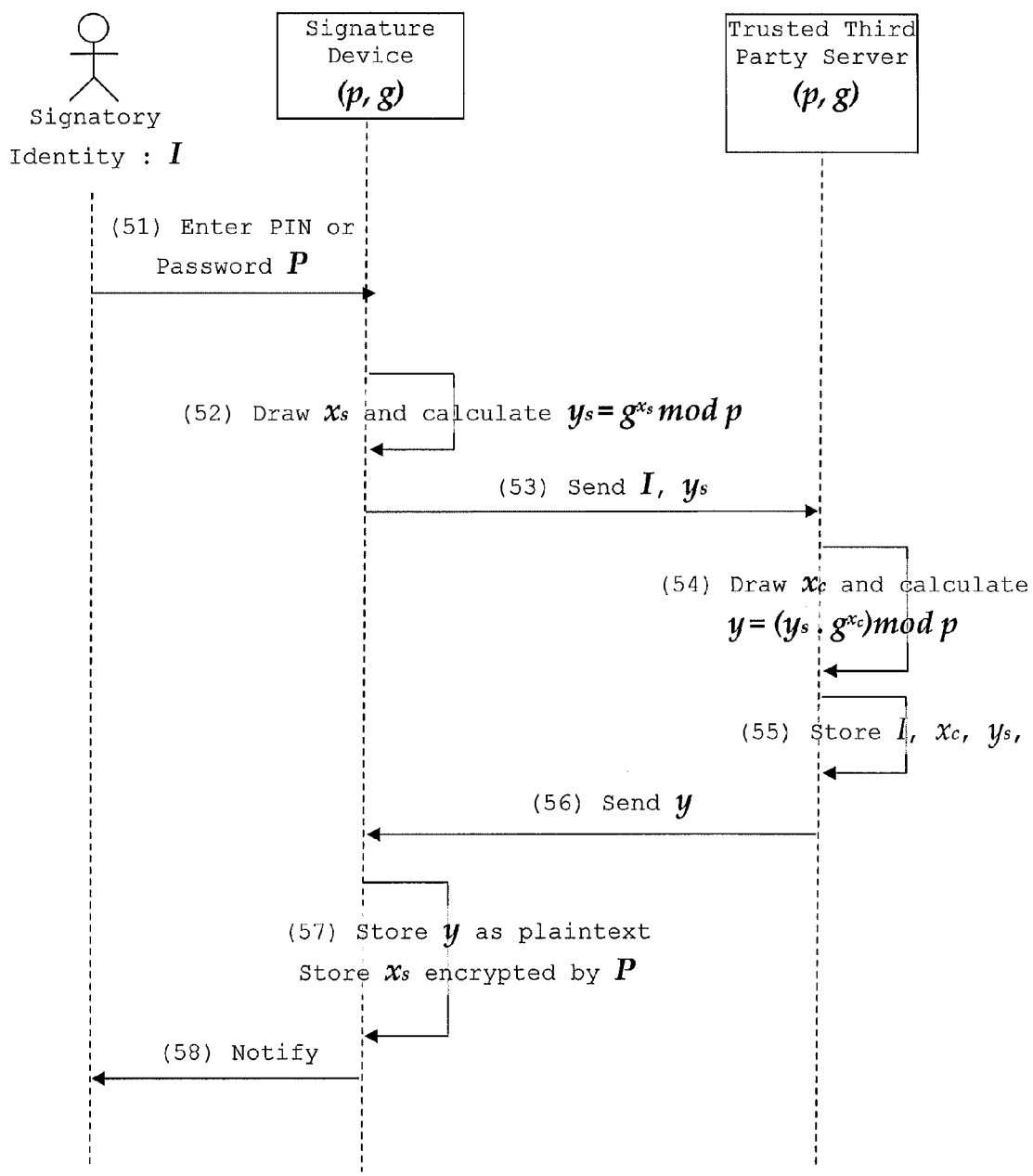
Figure 5: Process for Generating the El-Gamal / Harn Keys

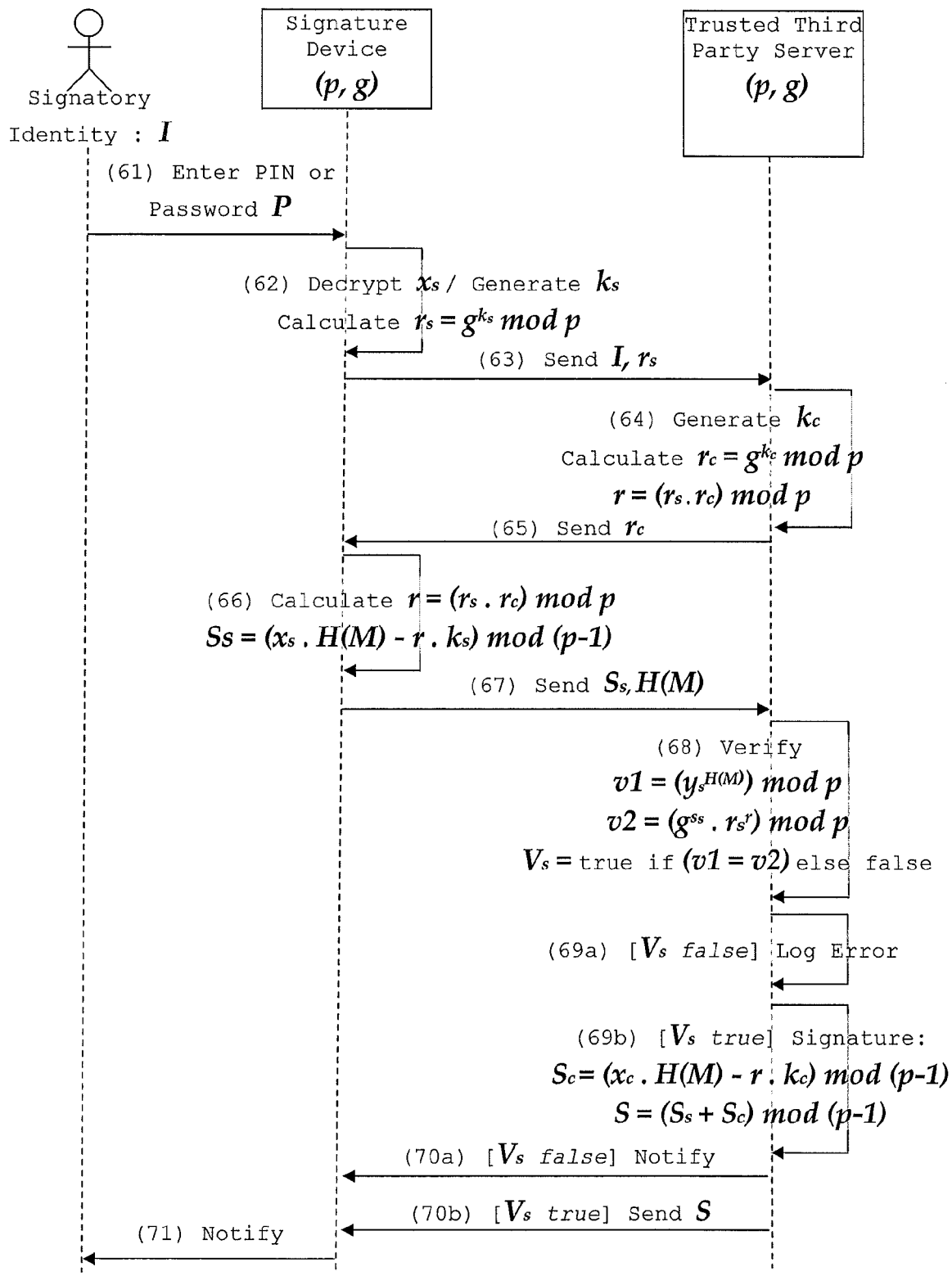
Figure 6: Process for Calculating El-Gamal / Harn Signature

METHOD FOR TWO STEP DIGITAL SIGNATURE

The present invention relates to a method of digital signature using a public-key multi-signature scheme and involving a trusted third party server with the aim of protecting the private key of the signatory.

PROBLEM AREA AND PRIOR ART

The digital signature is a mechanism making it possible to authenticate the author of a message or of an electronic document and to guarantee the integrity of said message or document. From the legal point of view, the electronic signature is recognized in numerous countries and in particular in France, as a proof of commitment of a person, just like a hand-written signature. The prior art within the context of which the present invention lies is described in relation to bibliographic references which are indicated between square brackets ([ ]) in the text, and which are listed at the end of the present description.

From a technical point of view, the digital signature implements public-key cryptographic methods, the most widespread being RSA [4] and DSA [2]. It consists, in respect of the signatory of a message, in performing a cryptographic calculation (signature function) on this message (or on a derivative of hash type) with the aid of a secret known to him alone and called a private key. The result of this function constitutes the digital signature of the message. The receiver of the signature and of the message (also termed the verifier), for its part, carries out a cryptographic calculation (a verification function) on the message (or its hash), the signature with the aid of a datum called a public key. This verification function tells him whether or not the signature received is valid. The public key is in general freely distributed in the form of a digital certificate which makes it possible to associate it with the identity of the signatory.

The confidential nature and the protection of the private key are essential since in the case where the latter is compromised by a third party, the latter can pass himself off as the legitimate owner of the private key and produce signed documents in the name of the latter and without his knowledge (thereby constituting identity usurping). The implementation of an electronic signature solution must therefore be accompanied by strict measures intended to protect the private key of the signatory. Private key protection remains in most cases a genuine technical challenge, and to date the only solutions considered to be reliable are those using secure specific hardware means for private key storage, such as for example a chip card, a secure USB key, or a secure memory card. The difficulty related to this protection and/or the means required for the latter represent a genuine brake to the deployment of on-line services requiring electronic signature, in particular for the general-public. In other cases, imperfect protection of this private key can weaken the security of such services. This is the case in particular when dealing with services intended for the general-public and for which the setting up of strict security means or directives turns out to be difficult or indeed impossible. It is possible to cite for example:
- the signing of a contract or of a rider with a service provider,
- the carrying out of financial transactions: money transfers, stock market orders, etc,
- on-line purchases (electronic commerce),
- administrative actions (on-line administration), etc.

STATE OF THE ART

The techniques known in the state of the art which are intended to protect the private key of a signatory have been cataloged hereinbelow. These techniques combine various software means or electronic means along with cryptographic methods which may or may not be related to the signature operation.

Encrypted Key File

The most widespread of these techniques consists in encrypting the private key by means of a secret key derived from a password known only to the signatory. The key thus encrypted is stored in a file jointly with the associated certificate. This solution is implemented in much general-public software such as Internet browsers and messaging clients, in general through the PKCS#11 standard [9] and the PKCS#5 standard [8].

The major problem with such a solution is that as soon as an attacker has access, even temporary, to the key file, he can attempt an off-line dictionary attack on the private key in the following manner:

1) Choosing of a candidate value P for the password
2) Decryption of the private key encrypted with the aid of P and obtaining of a candidate private key Kpriv.
3) Calculation of a signature S with the aid of Kpriv on an arbitrary message M: S=Sign (Kpriv, M)
4) Verification function with, as parameters, S, M and the public key Kpub: V=Verify(S, M, Kpub)
5) If V is true, then the key has been discovered. In the converse case, the algorithm resumes at step 1 with a new value of P.

It will be noted that in practice, depending on the signature algorithm used, much more efficacious means of attack may exist. The one described hereinabove is always possible whatever algorithm is used.

The security of this mode of protection therefore relies on the quality of the password chosen by the signatory to protect his private key. It is public knowledge that the choice of passwords is not necessarily judicious and that as soon as a password is too long or too complex, a user's prime reflex is to note it down and to keep it in proximity to his personal computer. This mode of protection cannot therefore be considered satisfactory for sensitive applications.

Microcircuit Card

Another solution consists in using an electronic device, such as a microcircuit card or a USB key for the storage of the private key and optionally the signature calculation. Here again, the private key is protected by a password or a PIN code, but it is the electronic device which carries out the verification of this password. The private key is returned (or the signature calculated) only if the password entered is correct. In the converse case, the device logs the fruitless attempts to input the password and may, after a given number of attempts (typically 3), block access to the signature key.

This solution is presumed to be safe in as much as chip cards integrate advanced devices for protecting the memory against passive attacks such as SPA ("Simple Power Analysis") or DPA ("Differential Power Analysis") signals analysis. The drawback of this solution is its difficulty of implementation within the framework of general-public applications and the significant costs that it engenders. Hence, this type of solution is today reserved for professional applications.

Cryptographic Camouflage

A third solution, the subject of a patent [1], proposes effective protection of the private key of the signatory by means of a method called cryptographic camouflage. In this method, as in the first one examined, the private key is stored encrypted by means of a password. In document [1], however, the protection of the private key does not depend solely on the quality of the password, which may be of a reduced size and easily memorizable by the signatory.

The security of this method relies essentially on the fact that:

1) The public Key of the user is not freely accessible but distributed solely to one or more trusted third parties, who alone are in a position to undertake the verification of a signature.

2) The signature function must be probabilistic, that is to say that it must be possible for a large number of valid signatures to correspond to one and the same message to be signed.

With certain precautions, this solution allows effective protection of the private key of the signatory. Its main defect is that it also necessitates protection of the public key by the verifier trusted third parties. This mode of operation is not compatible with the current public-key infrastructures in which the public keys are freely distributed in certificates and for which anyone can verify a signature and place his faith in it once he trusts the issuer of the certificate (Certifying Authority).

Other Methods Using Digital Signatures

Diverse methods, such as those described in documents [14], [15] or [16], using digital signatures are also known in the prior art. But these documents do not address the technical problem solved by the invention, consisting in protecting the private key of the signatory so as to avoid the usurping of his identity. Furthermore, in this type of document, a single private key is used for one and the same signature operation.

In [14] and [15], provision is made for signed documents to be circulated in a hierarchical structure, by adding at the level of the recipient one or more digital counter-signatures to an already signed document originating from an issuer, before transmitting the document to the next recipient.

In [16], a single private key of a mobile agent is split up into pieces among a certain number of hosts visited by the mobile agent, each piece being used to calculate a partial key, this being the antithesis of the solution adopted by the present invention.

AIMS OF THE INVENTION

An aim of the invention is to propose a method of digital signature able to alleviate the drawbacks of the above methods corresponding to the prior art. In particular, a major aim of the invention is to propose a signature method such that systematic attacks do not make it possible to find the private key of the signatory. Thus, to protect the private key of the signatory, it becomes unnecessary to resort to special hardware protection devices such as microcircuit cards, USB keys or other equivalent devices.

Another aim of the invention is to propose a method which is compatible with the main public-key signature schemes, in particular RSA.

Another aim of the invention is to propose a device appropriate to the implementation of the method of digital signature according to the invention.

These aims are achieved by the method of digital signature and by the associated device, such as are described in greater detail hereinbelow.

SUMMARY OF THE INVENTION

The subject of the invention is a method of digital signature of a message M by a signatory having an identity I and making use of a signature device, said method using a public-key cryptography scheme and being characterized in that the signatory makes use of a public key $K_p$ and of two private keys $K_s$ and $K_c$, the second private key $K_c$ being deposited with a trusted third party, and in that it comprises, for each signature operation, two complementary steps, each carried out with a distinct private key, namely:

the calculation by the signatory of a pre-signature $S_s$ of the message M with the aid of his first private key $K_s$, and then the transmission of the message M and of the pre-signature $S_s$ to the trusted third party;

the verification by the trusted third party of the pre-signature $S_s$, followed by the calculation by the trusted third party of a signature S of the message M, with the aid on the one hand of the second private key $K_c$ of the signatory deposited with the trusted third party, and on the other hand of said pre-signature $S_s$ previously calculated by the signatory.

As keys are necessary, the method comprises, prior to the steps of signature and of verifying the signature, a step of generating and storing the keys, consisting in:

the generation by the signatory of his first pre-signature private key $K_s$;

the generation of the second private key $K_c$, this key being generated, according to the cryptography scheme used, either by the signatory alone, or by the trusted third party with the aid of elements that have been transmitted to him by the signatory;

the generation of the public key $K_p$ of the signatory, this key being generated, according to the cryptography scheme used, either by the signatory alone, or by the trusted third party with the aid of elements that have been transmitted to him by the signatory.

According to the invention, the pre-signing of a message M by the signatory comprises the following steps:

identification of the signatory at his signature device, with the aid of a password or of a PIN code;

decryption by the signature device of the signatory of the content of the keys file with the aid of said password or of said PIN code, and obtaining of the first private key $K_s$;

calculation by the signature device of the signatory of a pre-signature $S_s$ with the aid of his first private key $K_s$ and transmission to the server of the trusted third party of this pre-signature $S_s$, of the message to be signed M or of its hash H(M), and of the identity I of the signatory;

retrieval by the server of the trusted third party of the second private key $K_c$ of the signatory, with the aid of the identity I of the latter.

If the verification of the pre-signature $S_s$ shows that the pre-signature $S_s$ is not valid, the server of the trusted third party notifies the error to the signatory and logs the invalid pre-signatures $S_s$ for the signatory and, after a given consecutive number of invalid pre-signatures, blocks the use of the signature by the signatory by rejecting all his subsequent signature requests.

According to an advantageous variant of the invention, the pre-signature $S_s$ is calculated by applying a probabilistic cryptographic function to the hash H(M) of the digital message M and to the first private key $K_s$ of the signatory.

Advantageously, the verification value $V_s$ of the pre-signature is calculated by applying a verification function to the hash H(M) of the message, to the second private key $K_c$ and to the pre-signature $S_s$.

Furthermore, the calculation of the signature S by the server of the trusted third party is carried out by a function using the second private key $K_c$, the hash H(M) of the message and the pre-signature $S_s$ received from the signatory.

According to an important aspect of the method according to the invention, the signature S obtained for the message M with the aid of the two private keys $K_s$ and $K_c$ of the signatory may be verified by any third party knowing the cryptographic scheme used and making use of the public key $K_p$ of the signatory and of the message M or of its hash H(M), knowing that the public key $K_p$ of the signatory is freely distributed, in particular with the aid of a digital certificate able to associate the public key $K_p$ with the identity I of the signatory.

PRINCIPLE OF THE INVENTION

The principle of the method according to the invention consists of a cryptographic method of digital signature creation which is carried out, not in one, but in two steps, by using not one, but two private keys for one and the same signatory, the first private key being in possession of the signatory and the second private key being deposited by the signatory with a trusted third party C.

The signatory I thus makes use of his two private keys and of a public key $KP_I$, which are inter-related and whose determination depends on the cryptographic algorithm used.

The signature $S_I(M)$ of a message M by the signatory I may be obtained only on completion of a combination of a first step carried out by the signatory with his first private key, and of a second step carried out by the trusted third party C with the second private key of the signatory I. According to the invention, the two steps are complementary and indissociable in order to obtain the signature $S_I(M)$ of a message M.

Ultimately, in the method according to the invention, the signatory makes use of a first private key $K_s$ stored in enciphered form with the aid of a password or of a PIN code. By virtue of this private key $K_s$, the signatory can pre-sign a message. The server of the trusted third party makes use of a second key of a private nature $K_c$ allowing him to verify the messages pre-signed by the signatory with the aid of $K_s$, and then, to complete the signature process, in such a way that the message pre-signed with $K_s$ and then with $K_c$ can be verified with the aid of the public key $K_p$ alone. This public key $K_p$ may be freely distributed, typically in the form of a digital certificate.

General Characteristics of the Solution

The signature method which is the subject of the present patent application will be described in greater detail in what follows. This method makes it possible to guarantee the protection of the private key of the signatory without resorting to specific electronic means of chip card or USB key type, or affecting the paradigm of public-key architectures.

First of all, the general operating and security principles of the solution are described as well as its various components. After which, each step related to the signature process is described independently of the chosen cryptographic system. The following main steps are involved:

the generation of the keys by the signatory,
the obtaining of a signature by the signatory,
the verification of a signature by a verifier.

Finally, the above steps are detailed in a practical manner and the security is analyzed in detail within the framework of two different embodiments using two distinct cryptographic signature schemes, including the most widespread, namely RSA.

The signature method involves a third party in addition to the signatory himself, namely a trusted third party provided with a computerized server provided with software able to perform, in particular, the signature verification operations envisaged by the present invention.

The signatory makes use of two private keys, namely:
a first private key $K_s$ termed the pre-signature key, and
a second private key $K_c$ associated with the signatory and deposited by him with the server of the trusted third party.

A third key constitutes the public Key $K_p$ of the signatory, which may be freely distributed, preferably within a digital certificate in such a way that it can be associated with the identity I of the signatory.

According to the invention, during a signature generation operation, the signatory calculates a pre-signature $S_s$ with the aid of his pre-signature private key $K_s$ and submits it to the server of the trusted third party. The latter verifies the validity of this pre-signature $S_s$. If it is correct, it signs it with the aid of the second private key $K_c$ associated with the signatory, thus producing a signature S which is thereafter transmitted to the signatory. The signature S thus produced may be verified by anyone making use of the public key $K_p$ of the signatory.

If the pre-signature $S_s$ received by the server of the trusted third party is incorrect, this denotes an invalid pre-signature private key $K_s$ and by extension an invalid PIN code or password entered by the signatory. In this case, the server of the trusted third party logs this invalid pre-signature for the signatory and, after a given consecutive number of invalid pre-signatures, may block the use of the signature by the signatory by rejecting all his subsequent requests.

Security Principles

The security of the method relies on the following basic principles:

The private key of the signatory is encrypted with the aid of a secret (password or PIN code) known only to him. This secret may consist of just a few digits (typically 4 or 6 digits like the PIN code of microcircuit cards).

The private keys of the server of the trusted third party that are associated with the various signatories are stored in a secure manner.

The only way of carrying out a publicly verifiable signature S for a signatory is to submit to the server of the trusted third party a pre-signature $S_s$ calculated with the aid of his private key $K_s$.

The server of the trusted third party logs the pre-signature errors $S_s$ and blocks the use of the signature by a signatory in the case of repeated errors.

In order that the solution be considered secure, the following principles will be added as a corollary and will have to be verified for all the cryptographic schemes adopted for the signature method:

An attacker making use of the encrypted private key $K_s$, of a set of messages $S_s$ pre-signed by the signatory and of the publicly accessible information (public key $K_p$ and signature S) must not be able to obtain information relating to the private key or to the password.

The server of the trusted third party does not at any time make use of the information allowing it to sign messages instead of the signatory, and does not know in particular his private key $K_s$.

DETAILED DESCRIPTION OF THE INVENTION

The invention will be better understood by referring to the description which follows, as well as to the figures, in which:

FIG. 1 represents a flowchart of the device required in order to be able to implement the method of digital signature according to the invention;

FIG. 2 represents a generic flowchart of the method of digital signature calculation according to the invention;

FIG. 3 represents a flowchart of the method for generating the RSA keys in the case where the invention is implemented with the aid of a cryptographic scheme of RSA type;

FIG. 4 represents a flowchart of the method of RSA signature calculation subsequent to the obtaining of the RSA keys in accordance with the method of FIG. 3;

FIG. 5 represents a flowchart of the method for generating the El-Gamal/Harn keys in the case where the invention is implemented with the aid of a cryptographic scheme of El-Gamal/Harn type;

FIG. 6 represents a flowchart of the method of El-Gamal/Harn signature calculation subsequent to the obtaining of the keys in accordance with the method of FIG. 5.

Reference is made to FIG. 1 to describe the components and parties of the solution according to the invention. The method according to the invention implements several hardware or software components and several parties to which reference will be made hereinafter and which are described briefly hereinbelow:

Device of the Signatory (1):

This is the system with which the signatory 11 interacts for signature calculation and for generating the keys. The method may be implemented on various types of devices once they make use of:

the software execution capabilities and calculation means required in order to undertake the generation of the keys (in particular, software 3 for generating keys) and the calculation of the signatures (in particular, signature calculation software 5);

a minimum capacity for storing data and/or interfacing with an external storage device (persistent memory card, not represented) so as to read and write the data relating to the private key (keys file 7);

capabilities for communicating across a data network 13 so as to implement the protocol for exchanges with the server of the trusted third party 9 during the generation of the keys and the signature calculations;

an entry and display device 1 for the exchanges with the signatory: display of the data to be signed, entry of the PIN code or password, indication of validity or invalidity of the PIN code.

The device 1 of the signatory 11 can therefore typically be:

a personal computer, a portable telephone, a personal assistant, without this list being limiting.

Software for Generating Keys (3):

This is the software component which executes within the device 1 of the signatory during the step of generating the keys. This software 3 interacts with the signatory and exchanges data with the server of the trusted third party 9 within this framework. This software may be a stand-alone program, it may consist of a component of a global computerized solution whatever it be (Operating system, Internet browser, Messaging client, etc.) or finally be realized in the form of a downloadable software component embedded in a WEB page. It may or may not be coupled to the signature calculation software described below.

Signature Calculation Software (5):

This is the software component which executes within the device 1 of the signatory during a signature calculation. This software interacts with the signatory and exchanges data with the server of the trusted third party 9 within this framework. This software may be a stand-alone program, may consist of a component of a global computerized solution whatever it be, or finally may consist of a downloadable software component embedded in a WEB page. It may or may not be coupled to the software for generating keys, described above.

Keys File (7):

This is the permanent memory wherein is stored, in encrypted form, the private key of the signatory as well as certain associated data such as the certificate and the address of the server of the trusted third party. This file 7 can reside permanently in the storage memory of the device of the signatory or on a removable memory connected to the latter. This file may, if necessary, be duplicated or transferred from one system to another depending on the requirements of the signatory. The encryption of the private key in this file is carried out with the aid of a secret-key algorithm such as AES [5] or Triple DES [1] by using a key derived from the password with the aid of a key derivation function. Such modes of encryption with the aid of a password are described in the PKCS#5 standard [8].

Server of the Trusted Third Party (9):

This is a computerized server operated by a service provider according to the rules of the art as regards security of access and data protection. The operator of this server may typically, but not necessarily, be a certifying authority. In this case, the creation of the certificate may be carried out at the end of the step of generating the keys.

Other Parties (not Represented in FIG. 1):

The other parties that may be involved in the digital signature related operations such as described in the present patent application are:

A Certifying Authority:

once the key generation step has been carried out, it may be useful for the signatory to have his public key certified by a certifying authority. For this purpose, he creates a certificate request consisting of elements for identifying the signatory and his public key, the whole signed with the aid of his private key. In the process required for obtaining this certificate, only the mechanism by which the signatory digitally signs his certificate differs from the current signature solutions implemented in public-key infrastructures. The process by which the certifying authority undertakes the verification of the request for a certificate and by which it verifies the identity of the signatory is not affected by the method described here.

Verifier:

the process of verifying the signature is not impacted by the method according to the invention. It follows from this that anyone making use of the public key and of the verification algorithm can, in a stand-alone manner, undertake the verification of a signature sent according to the method.

Generation of the Keys

This step is the first phase and is the preliminary to the use of the method by a signatory. It is carried out on the initiative of the signatory, using the software for generating keys executing on the device of the signatory. During this step:

the signatory will choose a PIN code or a password. The latter can also be generated in a random manner by the software for generating keys and be communicated to the signatory.

according to the cryptographic scheme used, the generation of the three keys necessary for the method, namely: first pre-signature private key $K_s$, second private key $K_c$ and public key $K_p$ will be carried out either directly by the software for generating keys of the signatory, or jointly by the signatory and the trusted third party. In all cases a secure protocol for exchanging keys is set up between the signatory and the trusted third party.

At the end of this step, the keys file is created. It contains the public key $K_p$ of the signatory as well as his pre-signature private key $K_s$, encrypted by means of the PIN code or the password. The mode of encryption used here can for example be one of those advocated by the PKCS#5 standard [8]. For its part, the server of the trusted third party makes use of the second private key $K_c$ associated with the signatory as well as his public key $K_p$.

After this step, the signatory may, if necessary, request a certificate from a certifying authority. This request, as indicated above, requires that the signatory undertakes the signature of his identity I and of his public key $K_p$. The method for doing this is identical to that described in the paragraph relating to signature calculation.

Signature Calculation

FIG. 2 describes the process of signature calculation independently of the cryptographic scheme used for its calculation. It should however be noted that, depending on the cryptographic scheme adopted, this process may differ slightly with respect to what is described. In particular, the calculation of the signature may require further exchanges between the signatory and the server of the trusted third party. This does not however call into question the general principle of the solution such as it is described. Hereinafter, two embodiments of the method are presented in detail with two different cryptographic schemes.

For security reasons and practical reasons, the signature functions operate on a digest or hash of the message rather than on the message itself. Hereinafter, H(M) will denote the hash of the message M. Examples of hash functions applicable to digital signature are available in [2].

The method steps indicated between parentheses in FIG. 2, are as follows:

(21) To undertake the signature of a message M, the signatory 11 whose identity is I has to enter his PIN code or his password on the device 1 of the signatory;

(22) The device 1 of the signatory undertakes the decryption of the keys file 7, with the aid of the PIN code or of the password entered previously, and thus obtains the pre-signature private key $K_s$;

(23) The device of the signatory undertakes the calculation of a pre-signature $S_s$ with the aid of a function $S_1$, of the message M and of the key $K_s$: $S_s = S_1(H(M), K_s)$;

(24) This pre-signature $S_s$ is transmitted to the server of the trusted third party along with the hash H(M) of the message to be signed and the identity of the signatory I;

(25) The server of the trusted third party retrieves the second private key $K_c$ corresponding to the signatory via his identity I, and then applies the verification function $V_1$ to the hash H(M) of the message, to the key $K_c$ and to the signature $S_s$, this amounting to calculating the value $V_s = V_1(H(M), S_s, K_c)$;

If $V_s$ is false, this denotes an invalid pre-signature private key $K_s$ and by extension an invalid PIN code or password entered by the user.

If $V_s$ is false, two cases are possible:

(26a) The server of the trusted third party logs the error and may, after a given number of successive errors, block the use of the signature by the signatory, or else:

(27a) The server of the trusted third party merely notifies the error through an appropriate message.

If Vs is true:

(26b) The server of the trusted third party carries out the signature calculation S with the aid of a function $S_2$ using the second private key $K_c$, the hash H(M) of the message and the pre-signature $S_s$ received from the signatory: $S = S_2(H(M), S_s, K_c)$. This signature S is such that it may be verified with the aid solely of the hash H(M) of the message and of the public key of the signatory $K_p$ by the verification function $V_2$: $V = V_2(H(M), S, K_p)$.

(27b) The server of the trusted third party transmits the signature S to the signatory.

(28) The signatory is informed of the result of the operation by the server of the trusted third party. In the case of an error in the pre-signature $S_s$, he can make a new attempt by entering a new PIN code or password. In the converse case, the message to be signed M and the associated signature S as well as optionally the certificate of the signatory may be transmitted to the verifier for verification.

In the proposed scheme, the signature function $S_1$ used absolutely must be of probabilistic type, that is to say for a message M to be signed, the signature function must be able to return a large possible number of signatures $S_s$ distributed in a random manner. In the converse case, an attacker can easily, with the aid of the keys file 7, of a message M (or H(M)) and of the associated signature $S_s$, conduct a dictionary attack on the PIN code until he finds the candidate key $K_s$ such that: $S_s = S_1(H(M), K_s)$.

Verification of the Signature

As indicated above, the verification of a signature by a verifier is carried out solely with the public key of the signatory according to a method identical to that in force in public-key architectures by applying the verification function $V_2$: $V = V_2(H(M), S, K_p)$. This verification algorithm will be described hereinafter for two signature schemes, including RSA.

Exemplary Embodiment with an RSA Cryptographic Scheme

Reference is made to FIGS. 3 and 4. In what follows, the various steps of the method are described in detail in the case of a signature calculated with the aid of the RSA algorithm, using 3 exponents.

Generation of the RSA Keys

FIG. 3 specifies the mode of generation of the keys in the case of the RSA cryptographic algorithm.

(31) The signatory of identity I chooses and enters his PIN code or his password P.

(32) The device 1 of the signatory randomly generates two prime integers p and q approximately of the same order and then calculates the modulus $n = (p \cdot q)$ and the Euler indicator function $\phi(n) = (p-1)(q-1)$. The proposed method is also applied to the so-called "multiprime" and "multipower" variants of RSA such as are described in [7] and [10]. In this case:

$$\text{If } n = \prod_{i=1}^{q} p_i^{k_i} \text{ then } \varphi(n) = \prod_{i=1}^{q} (p_i - 1) p_i^{k_i - 1} = n \prod_i \left(1 - \frac{1}{p_i}\right)$$

Where $p_i$, $i = 1 \ldots q$ are the randomly drawn prime factors of n.

(33) The device of the signatory uses a public exponent e agreed in advance (the values 3 or 65537 are commonly used). It randomly draws a private exponent $d_1$ of an agreed length and such that $\gcd(d_1, \phi(n)) = 1$ (where "gcd" denotes the "greatest common divisor" function). Finally, it calculates the exponent $d_2$ as the inverse modulo $\phi(n)$ of the product of e times $d_1$, i.e. such that: $e \cdot d_1 \cdot d_2 = 1 \mod \phi(n)$. The exponent $d_s$, of the signatory is one of the exponents $d_1$ or $d_2$, while the exponent $d_c$ of the server of the trusted third party is the other exponent, $d_2$ or $d_1$ respectively. The choice of $d_1$ or $d_2$ as private exponent of the signatory has no impact on security but makes it possible to shift the calculational burden during signature onto the signatory or the server of the trusted third party, depending on requirements. The public key is the pair (n, e), the private key of the signatory is $(n, d_s)$ and the private key of the server of the trusted third party is $(n, d_c)$.

(34) The device of the signatory transmits to the server of the trusted third party a message containing his identity I, his public key (n, e) and the exponent $d_c$ of the private key of the server of the trusted third party. The transmission of $d_c$ must be secure according to the rules of the art since this value must be known only to the server of the trusted third party. After which, the device of the signatory erases all the data used during the calculation with the exception of the public key (n, e) and of the private exponent $d_s$ of the signatory.

(35) The server of the trusted third party stores the public key (n, e) and the private exponent $d_c$ of the trusted third party which are associated with the identity I of the signatory.

(36) The server of the trusted third party acknowledges the message.

(37) The device of the signatory stores in the keys file, the public key (n, e) as plaintext and the private exponent $d_s$ of the signatory encrypted with the aid of the PIN or password P.

(38) The device of the signatory informs the signatory of the outcome of the procedure for generating the keys.

Calculation of an RSA Signature

RSA encryption being deterministic, it is appropriate to apply a probabilistic encoding function to the message to be signed. The effect of such a function is to add a random component to the message to be signed so that a message signed with a key may potentially lead to a large number of signatures. An example of such a function is proposed by the PSS signature scheme such as described in the standard PKCS#1[4].

Hereinafter, ES will denote the probabilistic encoding function and ES(H(M)) will denote this same function operating on a message M hashed by the hash function H. VS denotes the verification function associated with ES. If: VS(H (M), ES (H(M'))=True then H(M)=H(M') and therefore M=M'.

FIG. 4 describes the signature calculation process using the RSA algorithm. The details of the steps are specified hereinbelow.

(41) The signatory enters his PIN code or his password P.

(42) The device of the signatory retrieves the modulus n as plaintext and decrypts his private exponent $d_s$ with the aid of P.

(43) The device of the signatory calculates the pre-signature by applying the probabilistic encoding function $E_s$=ES (H(M)) and then the RSA encryption function (Modular Exponentiation) to the message M: $S_s=E_s^{ds}$ mod n

(44) This pre-signature $S_s$ is transmitted to the server of the trusted third party along with the hash H(M) of the message to be signed and the identity of the signatory I.

(45) The server of the trusted third party retrieves the modulus n, the exponent of the server of the trusted third party $d_c$ and the public exponent e associated with the identity I of the signatory. After which, it recovers the value of $E_s$ with the aid of the RSA decryption function for the exponent (e·$d_c$) $E_s=S_s^{(e \cdot dc)}$ mod n. Finally, the server of the trusted third party applies the verification function to the result of the decryption: $V_s$=VS(H(M), $E_s$)

Hereinafter, two cases are possible:

If [$V_s$ false]:

(46a) The server of the trusted third party logs the error.

(47a) The server notifies the error through an appropriate message

If [$V_s$ true]:

(46b) The server of the trusted third party carries out the calculation of the signature by RSA modular exponentiation: $S=S_s^{dc}$ mod n (47b) The server of the trusted third party transmits the signature S to the signatory.

(48) Finally, the signatory is informed of the result of the operation.

Verification of an RSA Signature

This process is in every respect identical to that used for an RSA-PSS signature generated according to the traditional method.

(1) The verifier obtains the public key of the signatory (n, e) with the aid of a transmitted certificate or via the interrogation of a database.

(2) The verifier recovers the value of $E_s$ with the aid of the RSA decryption function: $E_s=S^e$ mod n (3) The verifier applies the verification function to the result of the decryption: V=VS (H(M), $E_s$).

Security of the Method in Respect of the RSA Signature

The security of the method in respect of the RSA signature relies on scrupulous compliance with the processes described above in respect of the steps of generating the keys and of signature calculation, in particular:

Confidentiality in the communicating of the exponent $d_c$ to the server of the trusted third party. (This exponent may be, for example, communicated encrypted with the aid of an RSA certificate associated with the server of the trusted third party);

The erasure by the signatory device of the temporary data (prime factors of the modulus) and of the exponent $d_c$ of the server of the trusted third party during the step of generating the keys, The use of a probabilistic signature scheme with sufficient entropy.

Furthermore the encryption of the private exponent $d_s$ of the signatory must be carried out with certain precautions so as to avert attacks of the "known plaintext" type, namely:

The exponent necessarily being odd, its low-order bit is '1'. During the encryption of the exponent, the device of the signatory must replace this bit by a random, whereas during decryption, the value '1' is forced for this bit.

In the same manner, the high-order bit corresponding to the size of the exponent is known a priori and the same method as hereinabove may be employed to mask it.

Finally, in the case where the public exponent is equal to 3, the private exponent of the signatory must be relatively prime to 3. Here again, the solution consists in replacing, during encryption, the second low-order bit of the exponent by a random value. During decryption, the value of this bit is recalculated in such a way that the exponent is prime to 3.

Exemplary Embodiment with an El-Gamal/Harn Cryptographic Scheme

Reference is made to FIGS. 5 and 6. In what follows, the various steps of the method are described in detail in the case of a signature calculated with the aid of the Harn scheme [12] which is a multisignature variant of the El-Gamal signature method [11].

Generation of the El-Gamal/Harn Keys

FIG. 5 specifies the mode of generation of the keys in the case of the El-Gamal/Harn cryptographic algorithm.

The common signature parameters (p, g) are known to the device of the signatory and to the server of the trusted third party and are similar to those defined for the El-Gamal signature, namely:

p: a large prime integer, g: a positive integer less than p.

The details of the steps of the method for generating keys are specified hereinbelow.

(51) The signatory of identity I chooses and enters his PIN code or his password P.

(52) The device of the signatory randomly generates his private exponent $x_s$, a strictly positive integer less than p and then calculates the key $y_s=g^{xs}$ mod p

(53) The device of the signatory transmits to the server of the trusted third party a message containing his identity I and the key $y_s$. The transmission of $y_s$ must be secure according to the rules of the art since this value must be known only to the server of the trusted third party. After which, the device of the signatory erases the key $y_s$.

(54) The server of the trusted third party randomly generates his private exponent $x_c$, a strictly positive integer less than p and then calculates the key $y=y_s \cdot g^{xc}$ mod p. The public key is the triple (p, g, y), the private key of the signatory is (p, g, $x_s$) and the private key of the server of the trusted third party is (p, g, $y_s$, $x_c$).

(55) The server of the trusted third party stores the public key y, the key $y_s$, and the private exponent $x_c$ of the server of the trusted third party associated with the identity I of the signatory.

(56) The server of the trusted third party transmits the public key y to the device 15 of the signatory.

(57) The device of the signatory stores within the keys file, the public key (p, g, y) as plaintext and its signatory private exponent $x_s$ encrypted with the aid of the PIN code or of the password P.

(58) The device of the signatory informs the signatory of the outcome of the procedure for generating the keys.

Calculation of an El-Gamal/Harn Signature

FIG. 6 describes the signature calculation process in the case of the El-Gamal/Harn cryptographic algorithm. The details of the steps are specified hereinbelow.

(61) The signatory enters his PIN code or his password P.

(62) The device of the signatory retrieves the public key (p, g, y) as plaintext and decrypts the private exponent $x_s$ with the aid of P. It draws a strictly positive random number $k_s$ prime to (p−1) and then calculates the value: $r_s=g^{ks}$ mod p.

(63) This value $r_s$ is transmitted to the server of the trusted third party along with the identity of the signatory I.

(64) The server of the trusted third party retrieves the public key (p, g, y) and the trusted third party private key ($y_s$, $x_c$) which are associated with the identity I. It draws a strictly positive random number $k_c$ prime to (p−1), calculates the value: $r_c=g^{kc}$ mod p and then the product $r=(r_s \cdot r_c)$ mod p.

(65) The value $r_c$ is transmitted to the device of the signatory

(66) The device of the signatory calculates the product $r=(r_s \cdot r_c)$ mod p and then the pre-signature: $S_s=(x_s \cdot H(M)-r \cdot k_s)$ mod (p−1).

(67) This value $S_s$ is transmitted to the server of the trusted third party along with the hash H(M) of the message.

(68) The server of the trusted third party undertakes the verification of the pre-signature thus received by carrying out the following calculations: $V_1=(y_s^{H(M)})$ mod p and $V_2=(g^{Ss} \cdot r_s^{r})$ mod p The result of the signature verification $V_s$ is true if ($V_1=V_2$). In the converse case $V_s$ is false.

Hereinafter, two cases are possible:

If [$V_s$ false]:

(69a) The server of the trusted third party logs the error.

(70a) The server of the trusted third party notifies the error through an appropriate message.

If [$V_s$ true]:

(69b) The server of the trusted third party carries out the calculation of the signature S as follows: $S_c=(x_c \cdot H(M)-r \cdot k_c)$ mod (p−1); and then: $S=(S_s+S_c)$ mod (p−1)

(70b) The server transmits the signature S to the signatory.

(71) The signatory is informed of the result of the operation. The signature is formed of the pair: (s, r).

Verification of an El-Gamal/Harn Signature

The calculation used for the verification of the signature differs slightly from that used in the case of an ordinary DSA signature:

(1) The verifier obtains the public key of the signatory (p, g, y) with the aid of a transmitted certificate or via the interrogation of a database.

(2) The verifier undertakes the verification of the signature thus received by carrying out the following calculations: $V_1=(v_s^{H(M)})$ mod p and $V_2=(g^{Ss} \cdot r_s^{r})$ mod p.

The result of the signature verification $V_s$ is true if (V1=V2). In the converse case $V_s$ is false.

Security of the Method in Respect of the El-Gamal/Harn Signature

The security of the method in respect of the El-Gamal/Harn signature relies on scrupulous compliance with the processes described above in respect of the steps of generating the keys and signature calculation, in particular:

Confidentiality in the communicating of the key $y_c$ to the server of the trusted third party (this key may be, for example, communicated encrypted with the aid of an RSA certificate associated with the Server of the trusted third party);

The erasure by the signatory device of this key $y_c$ during the step of generating the keys.

Concerning the storage by the signatory device of the private exponent of the signatory $x_c$, as in the case of RSA, the parity bits and the high-order bit must be rendered random so as to avert attacks of the "known plaintext" type.

Advantages of the Invention:

The invention makes it possible to meet the intended aims, by proposing a method of digital signature having strengthened security of the private key of the user without needing to resort to constraining hardware means such chip cards or other secure electronic devices (PCMCIA card or USB key).

As seen, the signature method involves two parties, the signatory and the trusted third party, each making use of one of the two private keys of the signatory. Thus, not only may no signature be created without the signature of each of the parties with that one of the two private keys of the signatory which was assigned to them, but a first level of verification is assured by the trusted third party which, in the case of repeated failures (generally 3), blocks subsequent signature attempts. Thus in the case of access, even temporary, to the keys file of the signatory, any attack attempting to discover the first private key of the signatory is rendered impossible.

Moreover, the present invention is totally compatible with the mode of operation of the existing public-key infrastructures as well as with the currently most widespread signature method, namely RSA [4]. Indeed, in the case of the method applied to the RSA multiple signature, only the critical operations differ, namely the generation of the keys and the generation of the signature. Once an RSA signature has been calculated according to the method of the invention, this signature exhibits characteristics strictly identical to a signature calculated in a traditional manner, that is to say solely with the aid of the private key of the user. Furthermore, the signature may be verified by anyone making use of the associated certificate, with the aid of the same algorithm as that used within the framework of the traditional RSA signature.

Finally, the method may be easily implemented on a variety of fixed or nomadic electronic devices such as: personal computers, organizers, mobile telephones, games consoles, equipment of networks of the router or firewall type, etc.

Ultimately, the field of application of the present invention is vast. It is possible to cite by way of example:
- the digital signing of contracts,
- the authentication of a user in relation to a server for example a WEB site,
- the signing of transactions or authentication via mobile telephones (security with 2 factors),
- the signing of software,
- the establishing of virtual private networks (VPN), etc.

BIBLIOGRAPHIC REFERENCES CITED

[1] U.S. Pat. No. 6,178,058—Jan. 2, 2001—Kausik Method and apparatus for cryptographically camouflaged cryptographic key storage, certification and use.
[2] National Institute of Standards and Technology (NIST). FIPS 46-3, Data Encryption Standard (DES). October 1999.
[3] National Institute of Standards and Technology (NIST). FIPS 180-2, Secure Hash Standard (SHS). August 2002.
[4] National Institute of Standards and Technology (NIST). FIPS 186-3. Digital Signature Standard (DSS). March 2006.
[5] National Institute of Standards and Technology (NIST). FIPS 197. Advanced Encryption Standard (AES). November 2001.
[6] RSA Laboratories. PKCS#1 v2.1: RSA Encryption Standard. June 2002
[7] RSA Laboratories. PKCS#1 v2.0 Amendment 1: Multi-Prime RSA. July 2000.
[8] RSA Laboratories. PKCS#5 v2.0 Password-Based Cryptography Standard. March 1999
[9] RSA Laboratories. PKCS#11 v2.20: Cryptographic Token Interface Standard. June 2004
[10] RSA Laboratories. Cryptobytes Volume 5, No. 1-Winter/Spring 2002
[11] T. ElGamal. A public key cryptosystem and a signature scheme based on discrete logarithms, IEEE Trans. Inform. Theory 31 (4) (1985) 469-472
[12] L. Harn, Digital Multisignature with Distinguished Signing Authorities, IEE Electronics Letters, 35 (4) (1999) 294-295
[13] B. Schneier. Applied Cryptography Second Edition. 1996
[14] U.S. Pat. No. 4,868,877 A (FISCHER ADDISON)
[15] US 2007/208944 A1 (PAVLICIC MILADIN)
[16] US 2001/016911 A1 (OBANA SATOSHI)

The invention claimed is:

1. A method of digital signature of a message by a signatory having an identity and making use of a digital signature device on a network, said method using a public-key cryptography scheme and wherein the signatory makes use of a public key and of a first private key and a second private key that belong to the signatory, comprising:
generation by the signatory of the first private key on the digital signature device, wherein the first private key is kept in possession of the signatory;
generation of the second private key, the second private key being generated, according to the cryptography scheme used, either by the signatory alone, or by a trusted third party with the aid of elements that have been transmitted to the trusted third party by the signatory, wherein the second private key is deposited with the trusted third party; and
generation of the public key of the signatory, the public key being generated, according to the cryptography scheme used, either by the signatory alone, or by the trusted third party with the aid of elements that have been transmitted to the trusted third party by the signatory;
and for each signature operation, performing the following two complementary steps, each carried out with a distinct private key:
calculation by the signatory of a pre-signature of the message with the aid of the signatory's first private key, and the transmission of the message and of the pre-signature to the trusted third party; and
verification by the trusted third party of the pre-signature using the second private key and the public key, followed by calculation by the trusted third party of a signature of the message, with the aid of the second private key of the signatory deposited with the trusted third party, and of said pre-signature previously calculated by the signatory.

2. The method of digital signature as claimed in claim 1, further including:
secure transmission to the trusted third party of the public key and of the second private key or of the elements allowing their generation; and
encryption of the first private key of the signatory and storage of the encrypted first private key as well as of the public key in a keys file controlled by the signatory.

3. The method of digital signature as claimed in claim 2, wherein the second private key is determined as a function of the cryptography scheme used, of the first private key and of the public key of the signatory.

4. The method of digital signature as claimed in claim 2, wherein the pre-signing of a message by the signatory comprises the following steps:
identification of the signatory at a signature device of the signatory, with the aid of a password or of a PIN code;
decryption by the signature device of the signatory of the content of the keys file with the aid of said password or of said PIN code, and obtaining the first private key;
calculation, by the signature device of the signatory, of a pre-signature with the aid of the first private key and transmission to a server of the trusted third party of the pre-signature, of the message to be signed or of a hash of the message, and of the identity RIB of the signatory;
retrieval by the server of the trusted third party of the second private key of the signatory, with the aid of the identity of the latter signatory;
verification by the server of the trusted third party with the aid of the second private key and of the public key of the signatory, of the validity of said pre-signature, by calculating a verification value, indicating whether the pre-signature is valid, or false; and
if said pre-signature is valid, the server of the trusted third party calculates, with the aid of the second private key of the signatory, the signature.

5. The method of digital signature as claimed in claim 4, wherein if the pre-signature is not valid, the server of the trusted third party notifies an error to the signatory and logs the pre-signatures invalid for the signatory and, after a given consecutive number of invalid pre-signatures, blocks the use of the signature by the signatory by rejecting all subsequent signature requests of the signatory.

6. The method of digital signature as claimed in claim 2, wherein the pre-signature is calculated by applying a probabilistic cryptographic function to a hash of the message and to the first private key of the signatory.

7. The method of digital signature as claimed in claim 4, wherein the verification value is calculated by applying a verification function to the hash of the message, to the second private key and to the pre-signature.

8. The method of digital signature as claimed in claim 1, wherein the signature obtained for the message with the aid of the two private keys of the signatory may be verified by any third party knowing the cryptographic scheme used and making use of the public key of the signatory and of the message or of its hash.

9. The method of digital signature as claimed in claim 1, wherein the public key of the signatory is freely distributed, in particular with the aid of a digital certificate that associates the public key with the identity of the signatory.

10. The method of digital signature as claimed in claim 1, wherein the calculation of the signature by the trusted third party is carried out by a function using the second private key, a hash of the message and the pre-signature received from the signatory.

11. The method of digital signature as claimed in claim 1, wherein, using the RSA cryptographic scheme for the signature, the signature calculation comprises the following steps:
- entering a PIN code or a password of the signatory on a signature device;
- retrieving the RSA modulus n as plaintext and decrypting a private exponent ds with the aid of the password or of the PIN code;
- calculating the pre-signature with the aid of the signature device, by applying a probabilistic encoding function $E_s=ES(H(M))$ and then the RSA modular exponentiation function to the message $S_s=E_s^{ds}$ mod (n);
- transmitting said pre-signature to a server of the trusted third party along with a hash H(M) of the message to be signed and the identity of the signatory;
- retrieval, by the server of the trusted third party, of the modulus n, of the exponent dc corresponding to the second private key and of a public exponent e associated with the identity of the signatory, and then recovery of the value of $E_s$ with the aid of the RSA modular exponentiation function for the exponent produced (e·dc): $E_s=S_s^{(e \cdot dc)}$ mod n, and application of the verification function to the result of the decryption so as to calculate the verification value $V_s=VS(H(M), E_s)$;
- if VS is false, logging an error at the level of the server of the trusted third party and notifying the error to the signatory;
- if VS is true, calculating the signature S by the RSA modular exponentiation function: $S=S_s^{dc}$ mod n, and transmitting the signature S to the signatory.

12. The method of digital signature as claimed in claim 1, wherein, using the El-Gamal cryptographic scheme for the signature, the signature calculation comprises the following steps:
- entering a PIN code or a password P of the signatory on a signature device;
- retrieving with the aid of the signature device, the public key (p, g, y) as plaintext and decrypting a private exponent $x_s$ with the aid of P, and then drawing a strictly positive random number ks prime to (p−1) and calculating the value: $r_s=g^{ks}$ mod p;
- transmitting the value $r_s$ to a server of the trusted third party along with the identity of the signatory;
- retrieval, by the server of the trusted third party, of the public key (p, g, y) and of the second private key ($y_s,x_c$) associated with the identity, where $y_s$ is a part of the signatory's key that is known by the trusted third party, and $x_c$ is a random integer generated by the trusted third party, and then drawing a strictly positive random number kc prime to (p−1), and calculating the value: $r_c=g^{kc}$ mod p and then the product $r=(r_s \cdot r_c)$ mod p;
- transmitting the value $r_c$ to the signature device of the signatory;
- calculation by the signature device of the product $r=(r_s \cdot r_c)$ mod p and then of the pre-signature: $S_s=(x_s \cdot H(M)-r \cdot ks)$ mod (p−1);
- transmitting the value of the pre-signature to the server of the trusted third party along with a hash H(M) of the message;
- verification, by the server of the trusted third party, of the pre-signature thus received by carrying out the following calculations: $V1=(v_s^{H(M)})$ mod p; $V2=(g^{Ss} \cdot r_s^{r})$ mod p; the value of Vs signature verification is true if (V1=V2) and false in the converse case;
- if VS is false, the server of the trusted third party logs an error and notifies the error to the signatory;
- if VS is true, the server of the trusted third party carries out the calculation of the signature S as follows: $S_c=(x_c \cdot H(M)-r \cdot kc)$ mod (p−1); and then: $S=(S_s+S_c)$ mod (p−1).

13. The method of digital signature as claimed in claim 2, wherein the signature obtained for the message with the aid of the first and second private keys of the signatory may be verified by any third party knowing the cryptographic scheme used and making use of the public key of the signatory and of the message or of its hash.

14. The method of digital signature as claimed in claim 3, wherein the signature obtained for the message with the aid of the first and second private keys of the signatory may be verified by any third party knowing the cryptographic scheme used and making use of the public key of the signatory and of the message or of its hash.

15. The method of digital signature as claimed in claim 2, wherein the public key of the signatory is freely distributed, in particular with the aid of a digital certificate that associates the public key with the identity of the signatory.

16. The method of digital signature as claimed in claim 3, wherein the public key of the signatory is freely distributed, in particular with the aid of a digital certificate that associates the public key with the identity of the signatory.

17. The method of digital signature as claimed in claim 2, wherein, using the RSA cryptographic scheme for the signature, the signature calculation comprises the following steps:
- entering a PIN code or a password of the signatory on a signature device;
- retrieving the RSA modulus n as plaintext and decrypting a private exponent ds with the aid of the password or of the PIN code;
- calculating the pre-signature with the aid of the signature device, by applying a probabilistic encoding function $E_s=ES(H(M))$ and then the RSA modular exponentiation function to the message $S_s=E_s^{ds}$ mod (n);
- transmitting said pre-signature to a server of the trusted third party along with a hash H(M) of the message to be signed and the identity of the signatory;
- retrieval, by the server of the trusted third party, of the modulus n, of the exponent dc corresponding to the second private key and of a public exponent e associated with the identity of the signatory, and then recovery of the value of $E_s$ with the aid of the RSA modular exponentiation function for the exponent produced (e·dc): $E_s=S_s^{(e \cdot dc)}$ mod n, and application of the verification function to the result of the decryption so as to calculate the verification value $V_s=VS(H(M), E_s)$;
- if VS is false, logging an error at the level of the server of the trusted third party and notifying the error to the signatory;

if VS is true, calculating the signature S by the RSA modular exponentiation function: $S=S_s^{dc}$ mod n, and transmitting the signature S to the signatory.

18. The method of digital signature as claimed in claim 3, wherein, using the RSA cryptographic scheme for the signature, the signature calculation comprises the following steps:

entering a PIN code or a password of the signatory on a signature device;

retrieving the RSA modulus n as plaintext and decrypting a private exponent ds with the aid of the password or of the PIN code;

calculating the pre-signature with the aid of the signature device, by applying a probabilistic encoding function $E_s=ES(H(M))$ and then the RSA modular exponentiation function to the message $S_s=E_s^{ds}$ mod (n);

transmitting said pre-signature to a server of the trusted third party along with a hash H(M) of the message to be signed and the identity of the signatory;

retrieval, by the server of the trusted third party, of the modulus n, of an exponent dc corresponding to the second private key and of a public exponent e associated with the identity of the signatory, and then recovery of the value of $E_s$ with the aid of the RSA modular exponentiation function for the exponent produced (e·dc): $E_s=S_s^{(e \cdot dc)}$ mod n, and application of the verification function to the result of the decryption so as to calculate the verification value $V_s=VS(H(M), E_s)$;

if VS is false, logging an error at the level of the server of the trusted third party and notifying the error to the signatory;

if VS is true, calculating the signature S by the RSA modular exponentiation function: $S=S_s^{dc}$ mod n, and transmitting the signature S to the signatory.

19. The method of digital signature as claimed in claim 2, wherein, using the El-Gamal cryptographic scheme for the signature, the signature calculation comprises the following steps:

entering a PIN code or a password P of the signatory on a signature device;

retrieving with the aid of the signature device, the public key (p, g, y) as plaintext and decrypting a private exponent $x_s$ with the aid of P, and then drawing a strictly positive random number ks prime to (p−1) and calculating the value: $r_s=g^{ks}$ mod p;

transmitting the value $r_s$ to a server of the trusted third party along with the identity of the signatory;

retrieval, by the server of the trusted third party, of the public key (p, g, y) and of the second private key $(y_s, x_c)$ associated with the identity, where $y_s$ is a part of the signatory's key that is known by the trusted third party, and $x_c$ is a random integer generated by the trusted third party, and then drawing a strictly positive random number kc prime to (p−1), and calculating the value: $r_c=g^{kc}$ mod p and then the product $r=(r_s \cdot r_c)$ mod p;

transmitting the value $r_c$ to the signature device of the signatory;

calculation by the signature device of the product $r=(r_s \cdot r_c)$ mod p and then of the pre-signature: $S_s=(x_s \cdot H(M)-r \cdot ks)$ mod (p−1);

transmitting the value of the pre-signature to the server of the trusted third party along with a hash H(M) of the message;

verification, by the server of the trusted third party, of the pre-signature thus received by carrying out the following calculations: $V1=(v_s^{H(M)})$ mod p; $V2=(g^{Ss} \cdot r_s^r)$ mod p; the value of Vs signature verification is true if (V1=V2) and false in the converse case;

if VS is false, the server of the trusted third party logs an error and notifies the error to the signatory;

if VS is true, the server of the trusted third party carries out the calculation of the signature S as follows: $S_c=(x_c \cdot H(M)-r \cdot kc)$ mod (p−1); and then: $S=(S_s+S_c)$ mod (p−1).

20. The method of digital signature as claimed in claim 3, wherein, using the El-Gamal cryptographic scheme for the signature, the signature calculation comprises the following steps:

entering a PIN code or a password P of the signatory on a signature device;

retrieving with the aid of the signature device, the public key (p, g, y) as plaintext and decrypting a private exponent $x_s$ with the aid of P, and then drawing a strictly positive random number ks prime to (p−1) and calculating the value: $r_s=g^{ks}$ mod p;

transmitting the value $r_s$ to a server of the trusted third party along with the identity of the signatory;

retrieval, by the server of the trusted third party, of the public key (p, g, y) and of the second private key $(y_s, x_c)$ associated with the identity, where $y_s$ is a part of the signatory's key that is known by the trusted third party, and $x_c$ is a random integer generated by the trusted third party, and then drawing a strictly positive random number kc prime to (p−1), and calculating the value: $r_c=g^{kc}$ mod p and then the product $r=(r_s \cdot r_c)$ mod p;

transmitting the value $r_c$ to the signature device of the signatory;

calculation by the signature device of the product $r=(r_s \cdot r_c)$ mod p and then of the pre-signature: $S_s=(x_s \cdot H(M)-r \cdot ks)$ mod (p−1);

transmitting the value of the pre-signature to the server of the trusted third party along with a hash H(M) of the message;

verification, by the server of the trusted third party, of the pre-signature thus received by carrying out the following calculations: $V1=(v_s^{H(M)})$ mod p; $V2=(g^{Ss} \cdot r_s^r)$ mod p; the value of Vs signature verification is true if (V1=V2) and false in the converse case;

if VS is false, the server of the trusted third party logs an error and notifies the error to the signatory;

if VS is true, the server of the trusted third party carries out the calculation of the signature S as follows: $S_c=(x_c \cdot H(M)-r \cdot kc)$ mod (p−1); and then: $S=(S_s+S_c)$ mod (p−1).

* * * * *